United States Patent
Chen et al.

(10) Patent No.: US 8,134,934 B2
(45) Date of Patent: Mar. 13, 2012

(54) TRACKING NETWORK-DATA FLOWS

(75) Inventors: Aiyou Chen, New Providence, NJ (US); Jin Cao, Edison, NJ (US); Li Li, Edison, NJ (US)

(73) Assignee: Alcatel Lucent, Paris (FR)

( * ) Notice: Subject to any disclaimer, the term of this patent is extended or adjusted under 35 U.S.C. 154(b) by 228 days.

(21) Appl. No.: 12/563,476

(22) Filed: Sep. 21, 2009

(65) Prior Publication Data

US 2011/0069632 A1    Mar. 24, 2011

(51) Int. Cl.
*H04J 3/14* (2006.01)
(52) U.S. Cl. ......... 370/253; 370/229; 370/230; 370/235
(58) Field of Classification Search .................. 370/252, 370/253, 230, 229, 235, 389, 338, 278, 392, 370/395.32, 395.31; 709/224, 204, 250, 709/231; 711/170, 162, 158, 154, 103, 112, 711/100, 718, 216; 707/747, 698, E17.052; 726/23, 13, 22

See application file for complete search history.

(56) References Cited

U.S. PATENT DOCUMENTS

| | | | |
|---|---|---|---|
| 7,584,507 B1 * | 9/2009 | Nucci ............................ | 726/23 |
| 7,602,785 B2 * | 10/2009 | Dharmapurikar et al. .... | 370/392 |
| 2005/0195832 A1 | 9/2005 | Dharmapurikar et al. | |
| 2007/0177554 A1 * | 8/2007 | Yang et al. ..................... | 370/338 |
| 2007/0211647 A1 * | 9/2007 | Hao et al. ...................... | 370/254 |
| 2007/0237079 A1 * | 10/2007 | Whitehead .................... | 370/235 |
| 2007/0248084 A1 * | 10/2007 | Whitehead .................... | 370/389 |
| 2008/0225740 A1 * | 9/2008 | Martin et al. .................. | 370/252 |
| 2008/0243800 A1 * | 10/2008 | Beyer et al. .................... | 707/3 |
| 2008/0320585 A1 * | 12/2008 | Ansari et al. ................... | 726/13 |
| 2009/0030895 A1 * | 1/2009 | Eswaran et al. ................ | 707/5 |
| 2009/0046581 A1 * | 2/2009 | Eswaran et al. ............... | 370/230 |
| 2009/0228433 A1 * | 9/2009 | Aguilar Saborit et al. ....... | 707/2 |
| 2010/0274893 A1 * | 10/2010 | Abdelal et al. ................. | 709/224 |
| 2010/0281542 A1 * | 11/2010 | Stolfo et al. .................... | 726/23 |
| 2011/0087779 A1 * | 4/2011 | Martin et al. .................. | 709/224 |

OTHER PUBLICATIONS

"What's New: Finding Significant Differences in Network Data Streams," by Graham Cormode and S. Muthukrishnan, IEEE/ACM Transactions on Networking, vol. 13, No. 6, Dec. 2005, pp. 1219-1232.

"Space/Time Trade-offs in Hash Coding with Allowable Errors," by Burton H. Bloom, Communications of the ACM, vol. 13, No. 7, Jul. 1970, pp. 422-426.

"Summary Cache: A Scalable Wide-Area Web Cache Sharing Protocol," by Li Fan et al., IEEE/ACM Transactions on Networking, vol. 8, No. 3, Jun. 2000, pp. 281-293.

(Continued)

*Primary Examiner* — Aung S Moe
*Assistant Examiner* — Abdullah Riyami
(74) *Attorney, Agent, or Firm* — Mendelsohn, Drucker & Associates, P.C.; Steve Mendelsohn (57) ABSTRACT

A network-equipment-implemented method and apparatus for tracking durations of flows received at a network node in consecutive intervals utilizes two counting bloom filters in ping-pong operation to reduce memory and processing. Identifiers for flows that exceed a predetermined duration or number of intervals are stored in a long-duration flow-identifier table. Hash functions used within the counting bloom filters and optionally used in the long-duration flow-identifier table are chosen to minimize the probability of false positives in the detection of long-duration flows. In some embodiments, flows are sampled to conserve memory and processing resources at the risk of missing detection of some long-duration flows.

20 Claims, 3 Drawing Sheets

OTHER PUBLICATIONS

"Alcatel-Lucent 9900 Wireless Network Guardian Receives Top Honors in CTIA Emerging Technology Award in Two Separate Categories," www.redorbit.com, 2008, Retrieved from the Internet: <URL: http://www.redorbit.com/news/business/1324255/alcatel-lucent_9900_wireless_network_guardian_receives_top_honors_in_ctia/index.html> (3 pages).

"Botnet," http://en.wikipedia.org, 2009, Retrieved from the Internet: <URL: http://en.wikipedia.org/wiki/Botnet> (6 pages).

\* cited by examiner

TRACKING NETWORK-DATA FLOWS

BACKGROUND

1. Field of the Invention

The present invention relates to network data-flow monitoring, and, in particular, tracking and monitoring of long-duration network-data flows in a network.

2. Description of the Related Art

This section introduces aspects that may help facilitate a better understanding of the invention(s). Accordingly, the statements of this section are to be read in this light and are not to be understood as admissions about what is in the prior art or what is not in the prior art.

Computer networks have become an important part of our business and personal lives. Computer networks often span a large logical or geographical region such as a university campus, a neighborhood, or a corporation. Networking enables computers to conveniently share and access data.

Network management is the process of planning, securing, engineering, and operating a network to enable information sharing while reducing the risk of network failure and/or data/security compromise. A network needs to be monitored in order to allocate proper resources and to keep the data flow intact. Two of the tasks of network management are network-data monitoring and network-data regulation. Network-data monitoring is the process of monitoring various network-data flows. Network-data flows are streams of data packets through a network that share some common characteristics such as source and destination IP addresses. Network-data regulation is the process of rate controlling some data flows relative to other data flows, for example, to allow priority or real-time data to meet quality-of-service agreements, or to prevent malicious services from interfering with acceptable network performance.

Network-data flows are typically classified as either long-duration (LD) or short-duration (SD) network-data flows. A network-data flow is considered an LD network-data flow if it persists for a long period of time (e.g., greater than ten minutes). LD network-data flows generally include peer-to-peer (P2P) flows and video-traffic flows. However, in some cases, LD network-data flows may include botnet traffic. Botnet ("roBOT NETwork") traffic is traffic from groups of computer systems that have had malicious software installed by worms, Trojan horses, or other malicious software running on them. These computers often may be controlled remotely by a "botnet herder" or owner who can assemble these robot or zombie computers to coordinate a distributed denial-of-service attack. Thus, monitoring LD network-data flows constitutes an essential aspect of network management.

For example, Netflow® analyzer, a product of Cisco Systems Corporation (San Jose, Calif.), allows for monitoring of LD network-data flows. Cisco's Netflow® analyzer identifies network-data flows based on values in specific fields of incoming packets, such fields including source IP address, destination IP address, source port, destination port, layer 3 protocol type, type of services (ToS) byte, and input logical interface. For each flow in a network, Netflow® analyzer maintains in a hash table an identifier and the times of arrival (TOA) of the first and most-recent packet of the flow. This information allows a user to detect flows of various duration including LD network-data flows. However, maintaining this information for all flows in the network requires substantial computing and memory resources. If the goal of monitoring is specifically to track only LD flows, Netflow® analyzer's utilization of memory is inefficient since it also stores information about short-duration (SD) flows.

Another method for monitoring the duration of network-data flows is described in U.S. Pat. Pub. 2007/0237079, "Binned Duration Flow Tracking," incorporated herein by reference in its entirety. The publication describes a method for storing values identifying the beginning and end of network-data flows in bins that are implemented using counting bloom filters. According to the method, the bins cover independent and arbitrary time ranges such that the duration of the network-data flow can be determined from the time range of the bin that stores the packets corresponding to the network-data flow. The method, however, tracks all network-data flows including SD network-data flows and requires a bloom filter for each duration range, making its implementation costly.

Thus, there exists a need for efficient methods for detection of long-duration network-data flows, which methods are computationally feasible given the line speeds of modern networks and which require relatively little memory capacity.

SUMMARY

In one embodiment, the present invention is a network-equipment-implemented method for monitoring network-data flows at a node in a communication network. The method involves (a) receiving a network-data flow at the node in a current time interval, (b) determining a previous interval duration estimate for the network-data flow as a function of values stored in a first counting bloom filter associated with a previous time interval, (c) storing, in a second counting bloom filter associated with the current time interval, a new count that is a function of the previous interval duration estimate, and (d) storing, in a long duration flow identifier data structure, an identifier for the network-data flow, as a function of the new count.

In another embodiment, the present invention is an apparatus for tracking long duration network-data flows at a node in a network. The apparatus includes (a) means for receiving a network-data flow at the node in a current time interval, (b) means for determining a previous duration estimate for the network-data flow as a function of values stored in a first counting bloom filter associated with a previous time interval, (c) means for storing, in a second counting bloom filter associated with the current time interval, a new count that is a function of the previous duration estimate, and (d) means for storing, in a flow-identifier data structure, an identifier for the network-data flow, as a function of the new count.

In another embodiment, the present invention is an apparatus for monitoring one or more data flows in a communication network. The apparatus comprises (i) a previous bloom filter associated with a previous time interval and (ii) a current bloom filter associated with a current time interval. The previous bloom filter has (1) a previous set of hash functions and (2) an array of counters storing previous counter values. The current bloom filter has (1) a current set of hash functions and (2) an array of counters storing current counter values. For at least a first packet of each data flow received in the current time interval, the current counter value for each counter hashed to by applying the current set of hash functions to the data flow is updated based on (i) the current counter value and (ii) a previous duration estimate for the data flow derived from the previous bloom filter.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Figure 1:
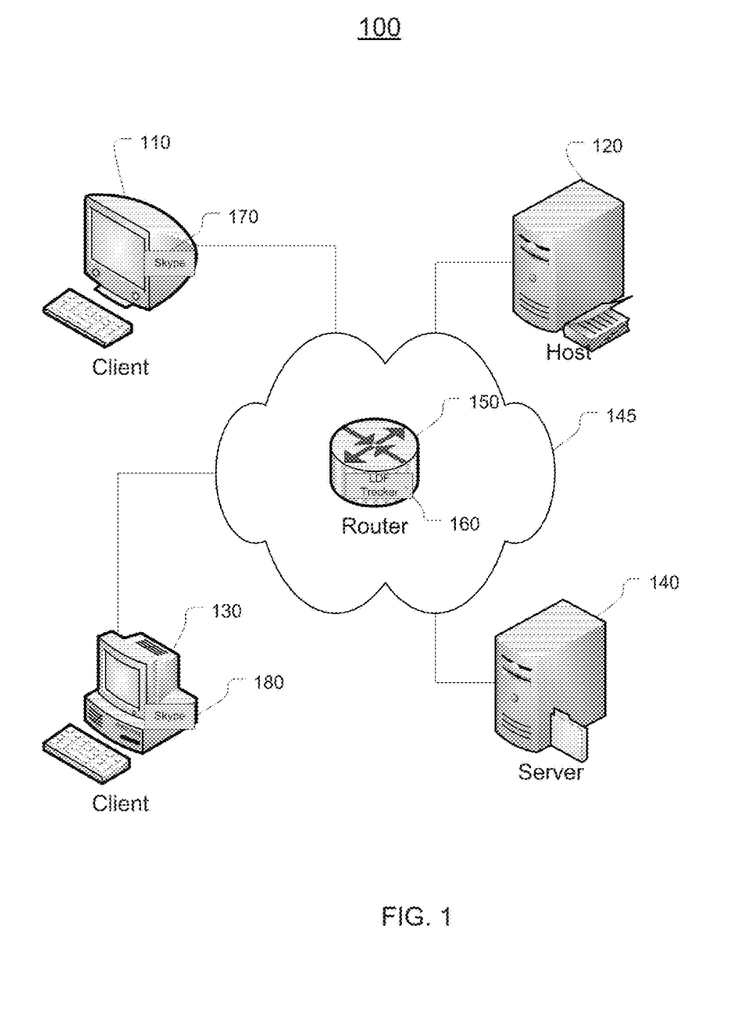
FIG. 1 illustrates exemplary communications network 100 according to various embodiments of the present invention.

FIG. 1 illustrates exemplary communications network 100 according to various embodiments of the present invention. Communications network 100 includes various network computing devices and elements including client computer 110, host computer 120, client computer 130, server computer 140, network cloud 145, and router 150. Data communications between any two or more computers in network 100 pass through network cloud 145, are generally routed through or visible to router 150, and are generally visible to the other computers in the network as well.

In exemplary network 100, router 150 hosts long-duration flow (LDF) tracker 160, and client computers 110 and 130 host real-time applications, in this case, Skype applications 170 and 180, respectively. Note that LDF tracker 160 could alternatively and equally well be hosted by one of the other network computing devices in network 100, e.g., server computer 140. Also note that LDF tracker 160 may be implemented in various ways, including as an application running on a network computing device, as dedicated circuitry, or as a combination of both, as would be understood by one skilled in the art.

In operation, users of Skype applications 170 and 180 may be communicating with each other using network 100. This data communication is thus typically visible to other computing devices on the network such as router 150 and, consequently, to LDF tracker 160.

Network 100 may include various network computing devices (hereinafter referred to as nodes) that store data, perform computational tasks, and share data with each other through the computer network. Nodes may include workstations (e.g., Linux® workstations), personal computers (e.g., Macintosh® and WinTel® personal computers), network appliances such as routers and switches, and mobile devices such as Internet-ready mobile phones, personal digital assistants (PDAs), and audio players. The data shared by the nodes may include messages (e.g., text messages), text documents (e.g., Microsoft® Office documents), multimedia files (e.g., audio files and movie files), or images.

In the computer network, the nodes share data with each other in the form of data packets (hereinafter referred to as packets). The packets are communicated among the nodes over different communication media. The communication media may include wired media (e.g., Ethernet), or wireless media (e.g., wireless local area network (WLAN), WiMax and Bluetooth).

Packets communicated between the nodes of the computer network that are associated with a common set of fields (e.g., same source IP and destination IP addresses on each packet) constitute a network-data flow. The identifier for a network-data flow is typically some function of that common set of fields. For example, a network-data flow may have an identifier which is the numeric value of the concatenation of the common source and destination IP addresses of packets within the flow. Alternatively, the identifier for a flow may be some function of the source IP address and port address. Other identifiers may be used as would be understood to one skilled in the art.

LDF tracker 160 is implemented by network equipment that can track the packets communicated in the network. Such network equipment may include routers, switches, servers, and/or other nodes. The network equipment may use software, hardware, or a combination of both.

LDF tracker 160 is designed to identify long-duration flows in the network. For example, LDF tracker 160 may monitor the flow of packets sent between Skype applications 170 and 180 hosted by computers 110 and 130, respectively. If the flow persists for longer than a predetermined duration (e.g., 30 minutes), LDF tracker 160 may capture information about the flow and optionally alert an operator to the presence and details of this long-duration flow in the network. To accomplish the task of tracking LD flows, LDF tracker 160 incorporates counting bloom filters and hash tables. A counting bloom filter is a modification of a bloom filter, the description of which follows.

Bloom Filters

A bloom filter is a data structure used to store a large number of data elements (e.g., a network dataflow identifier) succinctly (i.e., in a storage-efficient manner). A bloom filter stores a small set of values corresponding to each data element, which values may later be used to verify the presence of the data element in the bloom-filter storage. A bloom filter does not require storing the complete data element itself but rather a smaller representation (e.g., sketch) of the data element. A bloom filter thus provides a memory-efficient mechanism for performing many network-related tasks such as storing the occurrence of a particular network-data flow at a point in time and then later determining if a new network-data flow matches that particular flow.

As another example, a network administrator may wish to store a large number of username-password pairs and then determine at a later time whether one of those username-password pairs is presented at a terminal or seen on a network. Each username and password pair may comprise 20 bytes of data. In a traditional lookup table approach, 20 bytes of storage would be required to store each username-password pair so that a traditional matching algorithm could be used to search the storage for a bit-by-bit match. Through the mechanism of the bloom filter, however, the username and password is not stored at all. Rather, a mathematical transformation of the username and password is stored, which transformation may utilize significantly less that 20 bytes.

In practice, a bloom filter includes a bit array to store a set of binary values corresponding to a set of data elements. To determine what is stored in the bit array, the numerical equivalent value of a data element (e.g., the numerical value of a 64-bit data flow identifier created by concatenating the 32-bit source IP address of the flow to the 32-bit destination IP address of the flow) is presented to a set of hash functions. Each hash function in the set transforms the data element equivalent value to a new smaller value (e.g., 4 bits) corresponding to the number of storage locations in the bit array (e.g., 4-bit output hash functions may be used for bit arrays with 2^4=16 locations).

For example, assume a 64-bit network-data flow identifier formed from the concatenation of the common source IP and destination IP address of packets within that flow has a decimal value of 43,238 and is mapped by three different 4-bit output hash functions to decimal values of 8, 3, and 12, respectively. A binary value of one would be set in locations 8, 3, and 12 of the 16-bit binary bloom filter bit array.

Later, to check to see if a newly arrived flow with a given sourceIP-destinationIP concatenation identifier corresponds to the flow whose identifier was previously stored, the value of the new sourceIP-destinationIP concatenation is fed to the three hash functions and the three resulting locations are checked to see that each of them contains a binary value of one. If each location contains a value of one, or mathematically, if the minimum of the three locations equals one, then it has been determined with some degree of certainty that this particular sourceIP-destinationIP concatenation was previously stored in the bloom filter. If, on the other hand, one of the locations were zero, then it would be concluded with a certainty that the particular sourceIP-destinationIP concatenation was not previously stored.

Note that it is a characteristic of bloom filters that they are subject to false positives, i.e., indication that a data element is stored in the bloom filter when it is not. This is because counters set corresponding to the outputs of the hash functions for one identifier may overlap with counters set corresponding to the outputs of the hash functions for a unique second identifier resulting in one or more false-positive errors. The probability of false positives in a bloom filter with M array locations, K hash functions, and N data elements can be represented by following Equation (1):

$$(1-e^{(-NK/M)})^K \qquad (1)$$

Equation (1) indicates that an increase in number of hash functions and number of array locations will decrease the probability of false positives in the bloom filter. Bloom filters are not susceptible to false negatives.

More information on bloom filters, including information regarding the probability of false positive detections, can be found in B. H. Bloom, "Space/Time Trade-offs in Hash Coding with Allowable Errors," Communications of the ACM, 13(7):422-426, July 1970, incorporated herein by reference in its entirety.

Counting Bloom Filters

A counting bloom filter is a bloom filter in which the bit array is replaced with a counter array (i.e., each bit storage element of the bit array is replaced with a c-bit counter). This facilitates, for example, the deletion of elements from the bloom filter storage. More information on counting bloom filters can be found in L. Fan, P. Cao, J. Almeida, and A. Broder, "Summary Cache: A Scalable Wide-Area Web Cache Sharing Protocol," IEEE/ACM Transactions on Networking 8 (3): 281-293, June 2000, doi:10.1109/90.851975, and in G. Cormode and S. Muthukrishnan, "What's new: Finding significant differences in network data streams," IEEE/ACM Transactions on Networking, Vol. 13, No. 6, pages 1219-1232, December 2005, each incorporated herein by reference in its entirety. Since certain embodiments of the present invention deal with the modified use of counting bloom filters, in what follows, the terms "bloom filter" and "filter" should be understood to refer to "counting bloom filter" unless otherwise explicitly specified.

Long-Duration Flow Tracker

Figure 2:
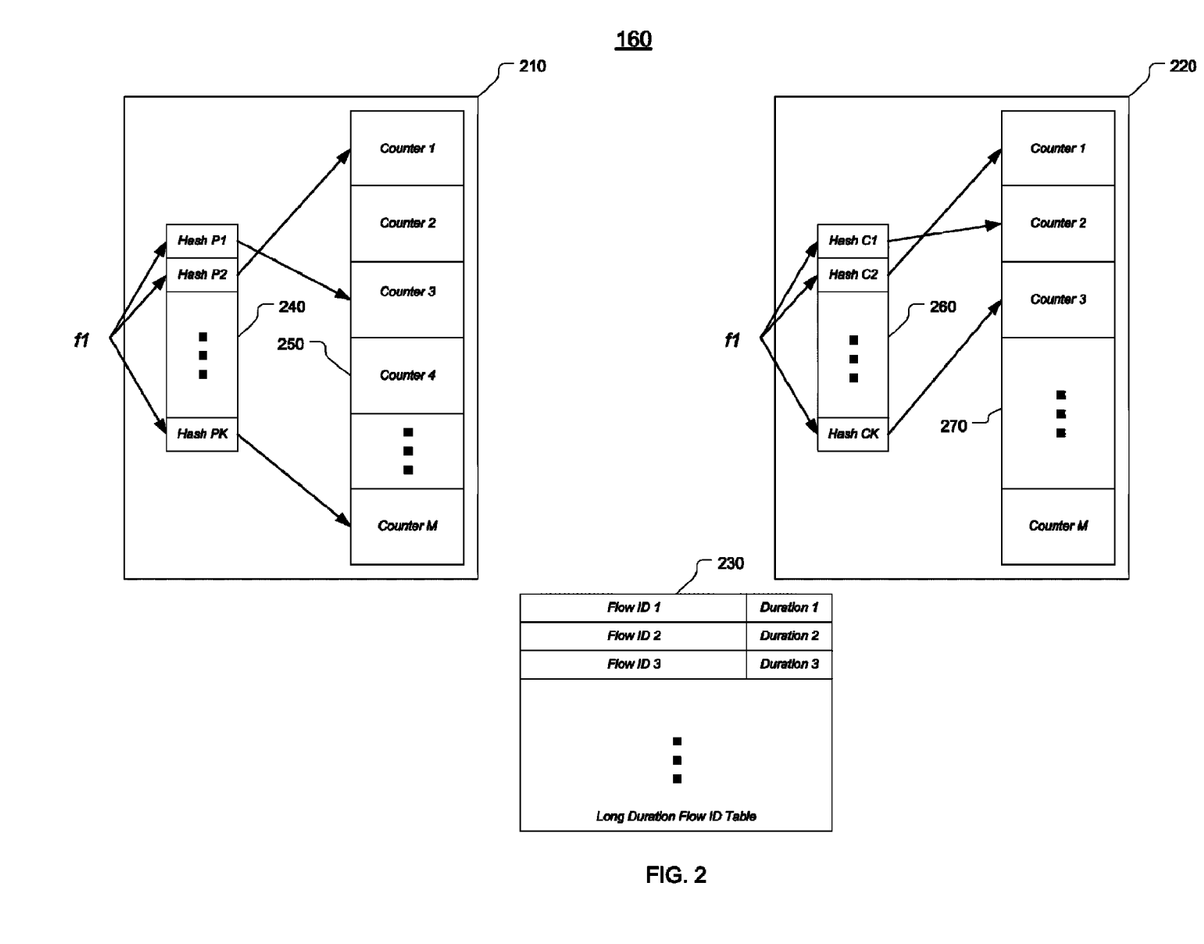
FIG. 2 illustrates some of the internal components of long-duration flow (LDF) tracker 160 of FIG. 1 according to various embodiments of the present invention.

FIG. 2 illustrates some of the internal components of LDF tracker 160 of FIG. 1 according to various embodiments of the present invention. FIG. 2 includes counting bloom filters 210 and 220 and long-duration flow-identifier table 230. Each bloom filter includes a hash-function set and a counter array. In particular, bloom filter 210 includes hash-function set 240 associated with counter array 250, and bloom filter 220 includes hash-function set 260 associated with counter array 270.

Each counter array contains M counters, and each hash-function set contains K hash functions, M>K Typically (but not necessarily), the two hash-function sets are different from each other. Although FIG. 2 indicates that the two bloom filters have the same number M of counters and the same number K of hash functions, that is not necessarily so. In general, the two bloom filters can have different numbers of counters and/or different numbers of hash functions. Using two different bloom filters helps to reduce the probability of false-positive detections of long-duration flows that can result from hash-function collisions in which two different flows are hashed to the same counter.

Although not shown in FIG. 2, LDF tracker 160 also may include a processing unit (e.g., CPU), memory, and/or application-specific integrated circuit, to implement and support the functionality of the aforementioned constructs, as would be understood to one skilled in the art.

In operation, bloom filters 210 and 220 are used in a ping-pong fashion by flow tracker 160, alternating between previous and current interval flow-tracking roles to count the number of contiguous time intervals $\Delta$ during which one or more packets from each flow are found to be present. Time interval $\Delta$ is generally selected to be equal to a flow timeout value that is roughly the maximum anticipated delay between two packets of the same flow. For example, for very low-rate flows, the maximum anticipated delay between packets of the flow may be 60 seconds. If $\Delta$ is set to 60 seconds, then if two consecutive packets with the same flow ID (e.g., same port and IP addresses) arrive at the tracker with an inter-packet gap of greater than 60 seconds, they may be interpreted to belong to separate flows. In other words, if a first packet with a particular flow ID is seen in an ith interval, no packet with that flow ID is seen in the i+1th interval, and a second packet with the particular flow ID is observed in the i+2th interval, the second packet is considered to be from a different flow than the first packet. One factor that imposes an upper limit on the length of time interval $\Delta$ is the desire to identify long-duration flows in a timely manner.

Identifiers for flows that are found to be present for greater than a specified threshold duration $d \gg \Delta$ are stored in long-duration flow-identifier table 230, along with, in some implementations, the duration value for the flow. Upon storing these long-duration flows, flow tracker 160 may alert an operator to their presence, for example, using a simple network management protocol (SNMP) alert message.

More specifically, at the beginning of a particular interval, one bloom filter is considered the previous bloom filter for that interval, and the other bloom filter is considered the current bloom filter for that interval, where the counters in the counter array of the current bloom filter are initialized to zero. During the interval, received packets for flows are processed. If a flow received in the current interval is found to have duration information stored in the bloom filter from the previous interval (i.e., the bloom filter presently playing the previous bloom filter role), then that flow's previous interval duration information is used to update the current bloom filter. In this way, at the end of an interval, all information that was stored in the previous bloom filter is either no longer relevant (e.g., it corresponds to a flow that was not present in the current interval and thus no longer needs to be tracked) or it has been used to update the durations of flows in the present bloom filter. Thus, at the end of an interval, the previous bloom filter for the interval is no longer needed, and its counters are reset to zero after taking on its role as the next current bloom filter.

During each interval $\Delta$, each received packet is processed, where only the first packet for each different flow is used to update the counter values in the counter array of the current bloom filter. The process of determining whether or not a packet is the first packet for a flow in the current interval is described below in the discussion of FIG. 3. For each first packet, an identifier for the flow (e.g., the concatenation of the source IP address and destination IP address of the packet) is presented to the hash-function set of the current bloom filter. Each hash function in the set maps the flow identifier to a counter in the counter array of the current bloom filter. Whenever a flow identifier is mapped to a counter, the counter value is incremented by one.

Note that it is possible for two or more different hash functions in a single hash-function set to map a particular flow identifier to the same counter. In that case, the counter will be incremented once for each such hash function. Nevertheless, for a well-constructed bloom filter, there will be at least one counter that is mapped to by only a single hash function for a particular flow identifier and therefore incremented only once for that flow identifier in the current interval.

Note further that it is possible for the hash-function set of the current bloom filter to map two or more different flow identifiers to the same counter. In that case, the counter will be incremented (at least) once for each different flow identifier. Nevertheless, for a well-constructed bloom filter, for each different flow identifier, there will be at least one counter that is mapped to by only that one flow identifier in the current interval.

Given these characteristics of a well-constructed bloom filter, the current duration estimate for a flow is assumed to be equal to the minimum counter value of all of the counters mapped to when the current hash-function set is applied to the flow identifier for that flow.

Figure 3:
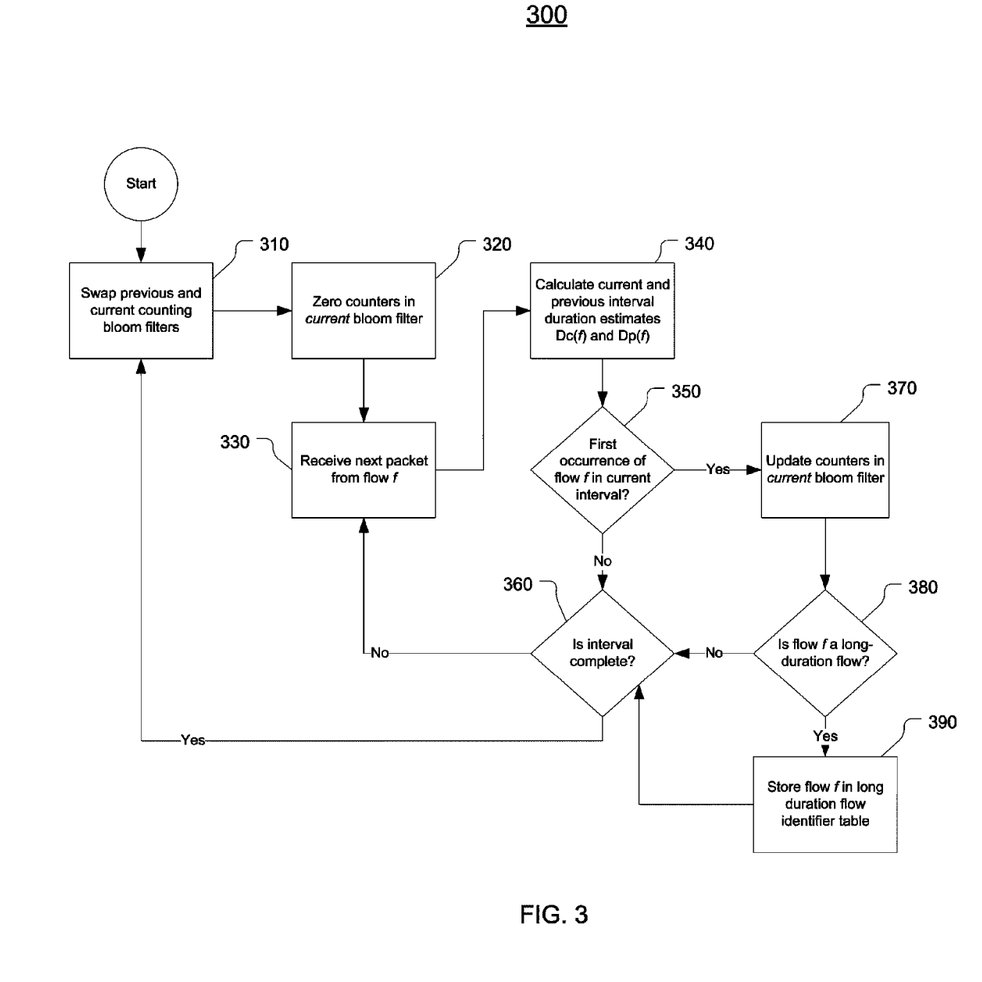
FIG. 3 illustrates general procedure 300 for detecting long-duration flows in a network according to various embodiments of the present invention.

FIG. 3 illustrates general procedure 300 for detecting LD flows in a network according to various embodiments of the present invention. In step 310, a new interval begins with the swapping of the roles of the previous and current counting bloom filters. Note that, if this is the first interval following initialization or startup of the LDF tracker, then both counting bloom filters will start with their counters containing zero counts, and there is no significance to which filter is designated as previous and which filter is designated as current. However, if this is not the first interval, then, after swapping roles, the bloom filter that was previously the current bloom filter and is now the previous bloom filter may have important duration data within it. In step 320, the counters in the present interval's current bloom filter are set to zero.

In step 330, a packet is received from a flow f and, in step 340, duration estimates are calculated for the flow using information stored in the current and previous bloom filters. To see how this is done, let $D_c(f)$ designate the duration estimate of flow f from the current bloom filter. $D_c(f)$ can be determined using the following Equation (2):

$$D_c(f) = \min[C_{ck}(f)], k=1, \ldots, K, \quad (2)$$

where $C_{ck}(f)$ is the value in the counter of the counter array of the current bloom filter that is mapped to by the kth hash function in the hash-function set of the current counting bloom filter when that kth hash function is fed the value of the identifier for flow f. Similarly, let $D_p(f)$ designate the duration estimate of flow f from the previous bloom filter, according to the following Equation (3):

$$D_p(f) = \min[C_{pk}(f)], k=1, \ldots, K, \quad (3)$$

where $C_{pk}(f)$ is the value in the counter of the counter array of the previous bloom filter that is mapped to by the kth hash function in the hash-function set of the previous counting bloom filter when that kth hash function is fed the value of the identifier for flow f.

Note that the minimum value is taken in Equations (3) and (4) to deal with those cases where overlap between hash-function mappings may have led to higher counts in some of the counters.

Next, in step 350, a test is performed using these estimates to see if the received packet is the first packet from flow f received during the current interval (i.e, if this is the first time the flow has been encountered in the current interval). This test involves determining whether duration information for flow f has already been stored in the current counting bloom filter. If the duration estimate for flow f from the current bloom filter is greater than the duration estimate for flow f from the previous bloom filter, i.e., $D_c(f) > D_p(f)$, then it is assumed that a previous packet from flow f has already been received during the current interval and used to increment the counter values of the current bloom filter. In this case, further processing of the current packet can be skipped, and the process proceeds to step 360, where a test is done to see if the interval is complete. If the interval is not complete, then the process returns to step 330 to await arrival of a new packet. If the interval is complete, then a new interval begins with the swapping of the previous and current bloom filters in step 310.

If, in step 350, it is determined that the current packet is the first packet from flow f received during the current interval (i.e., $D_c(f) \leq D_p(f)$), then, in step 370, the counters of the current bloom filter are updated. This update procedure is represented by Equation (4) below:

$$C_{ck}(f) \leftarrow \max[D_p(f)+1, C_{ck}(f)], k=1, \ldots, K \quad (4)$$

where K is the number of hash functions in the hash-function set.

In essence, Equation (4) states that the value for the counter in the counter array of the current bloom filter mapped to by applying the kth hash function in the current hash-function set to the identifier for flow f, is updated by setting it equal to the maximum of (i) the incremented value ($D_p(f)+1$) of the previous interval duration estimate ($D_p(f)$) and (ii) the counter's current value ($C_{ck}(f)$). Note that, if no packets in flow f were received in the previous interval, then the previous interval duration estimate ($D_p(f)$) will be zero. In that case, if no other packets for any flow in the current interval have been mapped to this counter, then the counter's current value ($C_{ck}(f)$) will also be zero, and the counter will be updated to one. Note further that, if one or more packets from other flows have already been mapped to this counter such that the counter's current value ($C_{ck}(f)$) is greater than the incremented value ($D_p(f)+1$), then the counter's current value will not be changed.

Following the update of the counters in step 370, in step 380, a test is performed to determine if flow f is a long-duration flow. If the current interval duration estimate ($D_c(f)$) for flow f is greater than a specified duration threshold d that is set, for example, by an operator, then flow f is said to be a long-duration flow and, in step 390, the flow identifier for flow f is stored in long-duration flow-identifier table 230 of FIG. 2 along with optionally the value of the duration. If flow f is already represented in table 230, then the value of the duration is updated for those implementations that explicitly track the duration value. Long-duration flow-identifier table 230 may be implemented using a traditional memory structure such as a linked list or string array or it may be implemented as a hash table to facilitate quick lookup of duration values. Processing then continues to step 360 to determine if the interval is complete.

If, in step 380, it is determined that flow f is not a long-duration flow, then processing returns to step 360 to determine if the interval is complete.

Note, in various embodiments, if (i) an identifier for a flow has been previously stored in the long-duration flow-identifier table and (ii) the flow is not present for one or more intervals, then the identifier for the flow may be eliminated from the long-duration flow-identifier table, potentially by an aging process.

Intuitively, if the flow was determined to have a previous interval duration estimate of x, and the flow is detected in the current interval, then it would make sense that its new duration should be one greater than x, where x represents a count of the number of contiguous intervals of duration A during which the flow has been present prior to the current interval. This is correct to the extent that the duration estimate for a flow has not been artificially inflated by hash collision between flows. Generally, if the number of flows is small relative to the number of hash functions K and the number of counters M in the counter arrays, then the probability of collisions between flows can be kept to a minimum (see, for example, Equation (1)). In such cases, the probability of false-positive detections of long-duration flows is also kept to a minimum.

In some embodiments, an absolute interval counter (separate from the counter array values) may be maintained as an independent check on counter value inflation. In these embodiments, counter value updates are capped at the current absolute interval counter. In some embodiments, all counter values (i.e., all flow information) is periodically flushed from the bloom filters to keep the total number of unique flows small relative to the size of the hash-function set K and the size of the counter array M. In some embodiments, once a flow is transferred to the long-duration flow identifier table, its duration estimate may be decremented from the relevant counters of the current bloom filter. In general, if the values for K and M are chosen properly with respect to the anticipated number and variety of flows and the duration $\Delta$, then the bloom filter arrangement of the present invention is self-purging and can be run without reset.

In some embodiments, long-duration network-data flows are analyzed to determine whether they represent malicious network activities such as botnets, worms, and distributed denial-of-service (DDoS) attacks. According to some embodiment of the present invention, hosts participating in identified long-duration network-data flows are looked up and/or added to existing black-listed hosts tables that are maintained on Internet servers by various agencies that are working to shut down such malicious activities. According to another embodiment of the present invention, packet sizes of the identified long-duration network-data flows are analyzed to determine the purpose of the long-duration network-data flows.

Various modifications to process 300, including substitution of threshold parameters to replace a 'greater than' test with a 'greater than or equals' test and equivalents, are possible while still remaining within the scope and intent of the present invention, as would be understood to one skilled in the art.

Sampling

In procedure 300 of FIG. 3, all received packets are processed. In fact, since Equation (4) ensures that the counter values for flow f will be incremented only once no matter how many packets from flow f are received in the current interval, in alternative implementations, step 350 can be omitted from FIG. 3 with processing proceeding from step 340 directly to step 370. In that case, there is also no need to calculate the current duration estimate $D_c(f)$ of flow f in step 340, and the test of step 380 can be implemented by, for example, comparing the previous duration estimate $D_p(f)$ of flow f, to a value that is one less than the specified duration threshold d.

In some embodiments of the present invention, processing and memory space are conserved by processing fewer than all packets that arrive at the LDF tracker. For example, rather than processing each and every packet that arrives at a node, every other packet, or every third packet may be processed. Alternatively, a uniform or other type of sampling of a fixed number S of packets per interval $\Delta$ may be performed (e.g., S=10). Intuitively, it can be seen that this would result in missing the detection of some long-duration network-data flows—particularly low-rate flows. However, statistically, depending on the sampling rate, the percentage of low-rate LD flows present in the traffic versus medium- and high-rate flows, the interval $\Delta$, and other factors, this may be a reasonable trade-off in some environments.

Although the present invention has been described in the context of monitoring the duration of network-data flows to detect long-duration network-data flows, the invention is not so limited. For example, the flow-ID table can be used to track the duration of every flow, not just those determined to be long-duration flows, and also flows whose durations falls within one or more duration bounds, e.g., flows lasting between 5 minutes and 10 minutes, and flows whose duration exceeds 30 minutes The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium or loaded into and/or executed by a machine, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

We claim:

1. A network-equipment-implemented method for monitoring network-data flows at a node in a communication network, the method comprising:
   (a) receiving a network-data flow at the node in a current time interval;
   (b) determining a previous duration estimate for the network-data flow as a function of values stored in a first counting bloom filter associated with a previous time interval;
   (c) storing, in a second counting bloom filter associated with the current time interval, a new count that is a function of the previous duration estimate; and
   (d) storing, in a flow-identifier data structure, an identifier for the network-data flow, as a function of the new count, wherein the new count for a counter in the second counting bloom filter represents a possible duration for a network-data flow that hashes to the counter.

2. The method of claim 1, wherein step (d) comprises:
   (d1) comparing the new count with a threshold count; and
   (d2) storing the identifier in the flow-identifier data structure based on the comparison of step (d1).

3. The method of claim 1, wherein the new count is a maximum of (i) the previous duration estimate plus one and (ii) a current count from the second counting bloom filter.

4. The method of claim 1, wherein each of the first counting bloom filter and the second counting bloom filters comprises a plurality of counters, each counter identified by an index, and the new count stored in step (c) is stored in a counter corresponding to a specific index.

5. The method of claim 4, wherein the specific index is a function of a hash applied to an identifier for the flow.

6. The method of claim 4 further comprising initializing each of the plurality of counters of the second counting bloom filter to zero at the beginning of the current time interval.

7. The method of claim 1, wherein, at the end of the current time interval, the first and second counting bloom filters swap roles with respect to the previous and current time intervals, respectively.

8. The method of claim 1, wherein:
   the network-data flow comprises a plurality of packets that are received during step (a); and
   one or more of steps (b) and (c) are applied to some but not all of the plurality of packets.

9. The method of claim 1, wherein the flow-identifier data structure comprises a hash table.

10. The method of claim 1, wherein:
    the first counting bloom filter comprises a first set of hash functions;
    the second counting bloom filter comprises a second set of hash functions; and
    the first set of hash functions is different from the second set of hash functions.

11. Apparatus for monitoring durations of one or more data flows in a communication network, the apparatus comprising:
    a previous bloom filter (i) associated with a previous time interval and (ii) having (1) a previous set of hash functions and (2) an array of counters storing previous counter values; and
    a current bloom filter (i) associated with a current time interval and (ii) having (1) a current set of hash functions and (2) an array of counters storing current counter values, wherein:
    for at least one packet of each data flow received in the current time interval, the current counter value for each counter hashed to by applying the current set of hash functions to the data flow is updated based on (i) the current counter value and (ii) a previous duration estimate for the data flow derived from the previous bloom filter; and
    the current counter value for a counter in the current bloom filter represents a possible duration for a data flow that hashes to the counter.

12. The apparatus of claim 11, wherein:
    the previous duration estimate for the data flow is based on a minimum of the previous counter values in counters hashed to by applying the previous set of hash functions to the data flow; and
    the current counter value for each hashed-to counter for the data flow is based on a maximum of (i) the current counter value and (ii) an incremented value of the previous duration estimate for the data flow.

13. The apparatus of claim 11, wherein the previous set of hash functions is different from the current set of hash functions.

14. The apparatus of claim 11, wherein:
    the previous bloom filter for a next time interval is the current bloom filter for the current time interval; and
    the current counter values for the current bloom filter for the next time interval are initialized to zero for the start of the next time interval.

15. The apparatus of claim 11, wherein, if the apparatus determines that the data flow is a long-duration data flow, then the data flow is represented in a data-flow table.

16. The apparatus of claim 15, wherein the data-flow table contains a duration estimate for each long-duration data flow represented in the data-flow table.

17. The apparatus of claim 11, wherein the current counter values are updated for each packet of each data flow.

18. The apparatus of claim 11, wherein the current counter values are updated for only the first data packet of each data flow received in the current time interval.

19. The apparatus of claim 11, wherein the current counter values are updated for only a subset of the data packets received in the current time interval.

20. Apparatus for monitoring durations of one or more data flows in a communication network, the apparatus comprising:
    a previous bloom filter (i) associated with a previous time interval and (ii) having (1) a previous set of hash functions and (2) an array of counters storing previous counter values; and
    a current bloom filter (i) associated with a current time interval and (ii) having (1) a current set of hash functions and (2) an array of counters storing current counter values, wherein:
    for at least one packet of each data flow received in the current time interval, the current counter value for each counter hashed to by applying the current set of hash functions to the data flow is updated based on (i) the current counter value and (ii) a previous duration estimate for the data flow derived from the previous bloom filter;
    the previous duration estimate for the data flow is based on a minimum of the previous counter values in counters hashed to by applying the previous set of hash functions to the data flow; and
    the current counter value for each hashed-to counter for the data flow is based on a maximum of (i) the current counter value and (ii) an incremented value of the previous duration estimate for the data flow.

* * * * *